(No Model.) 2 Sheets—Sheet 1.
L. FRENNET WAUTHIER.
BEET ROOT OR POTATO HARVESTER.
No. 528,869. Patented Nov. 6, 1894.
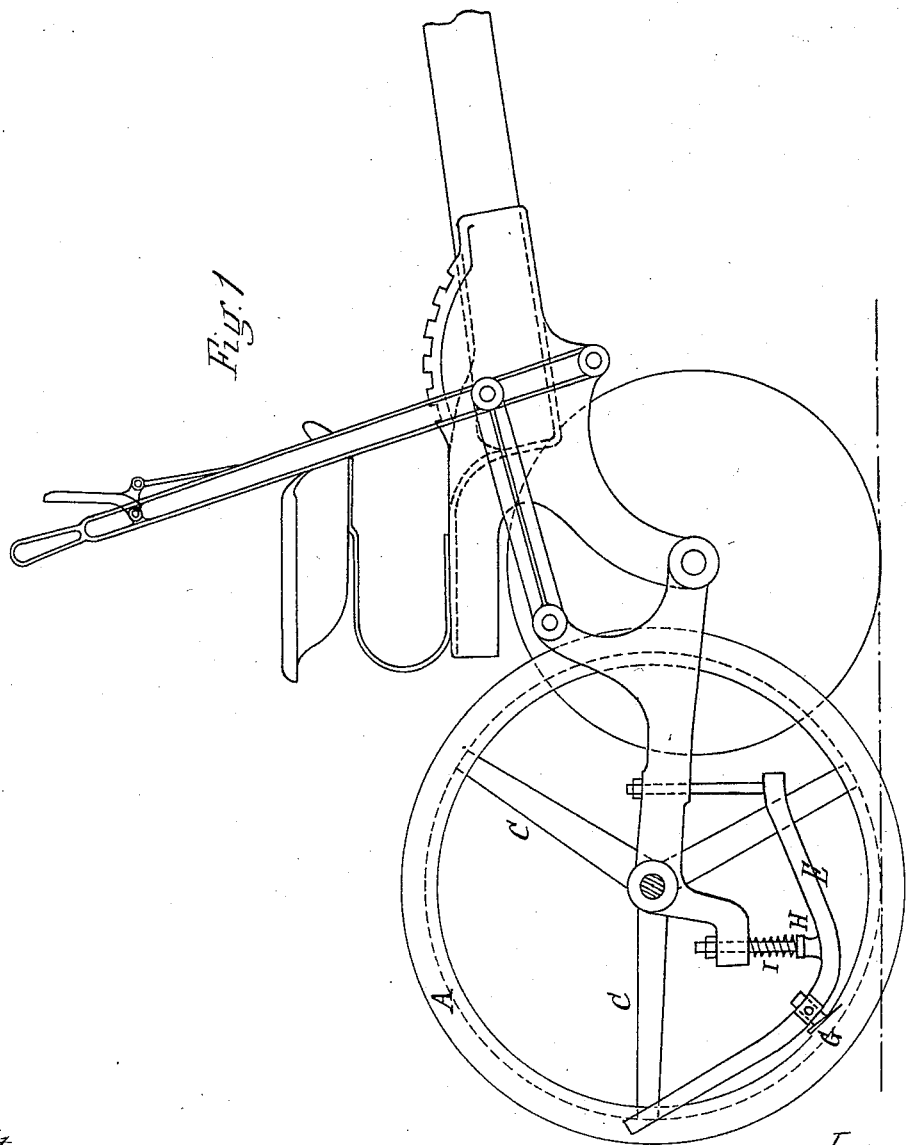

(No Model.) 2 Sheets—Sheet 2.
L. FRENNET-WAUTHIER.
BEET ROOT OR POTATO HARVESTER.
No. 528,869. Patented Nov. 6, 1894.
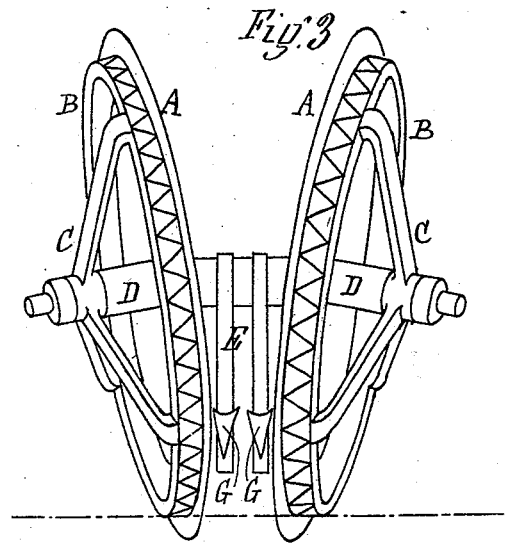
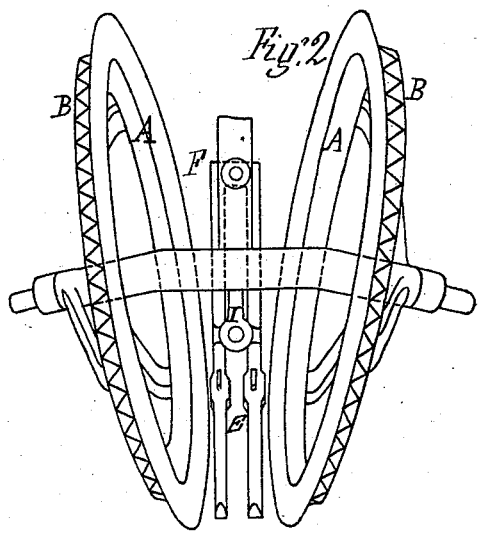

UNITED STATES PATENT OFFICE.

LOUIS FRENNET WAUTHIER, OF LIGNY, BELGIUM.

BEET-ROOT OR POTATO HARVESTER.

SPECIFICATION forming part of Letters Patent No. 528,869, dated November 6, 1894.

Application filed March 1, 1894. Serial No. 501,965. (No model.) Patented in France October 31, 1893, No. 233,771, and in Belgium October 31, 1893, No. 106,978.

*To all whom it may concern:*

Be it known that I, LOUIS FRENNET WAUTHIER, manufacturer, of Ligny, (Namur,) in the Kingdom of Belgium, have invented a Beet-Root or Potato Harvester, (for which I have obtained Letters Patent in Belgium, No. 106,978, dated October 31, 1893, and in France, No. 233,771, dated October 31, 1893,) of which the following is a specification.
This invention relates to a machine for extracting beet-roots and similar roots from the soil in such manner as to disturb the soil as little as possible.

Referring to the accompanying drawings, Figure 1, shows a longitudinal sectional elevation of the invention.

The machine consists essentially of two disks A of suitable dimensions which constitute the working parts of the machine. These disks which are similar in appearance to the flanged wheels of railway vehicles, are constructed of a circular ring having a sharp outer edge and from the inner edge of which projects outwardly laterally a second ring B at right angles thereto. On this ring B are formed projecting ribs either of the form shown on the drawings or of any other suitable shape, similar to those used with other agricultural machines for preventing the slipping of the disks on the soil. These disks are connected by arms C to a bent axis D so formed that the disks A are inclined to each other both in the horizontal and in the vertical direction, as shown at Fig. 2 which shows a plan of part of the machine, and Fig. 3 which shows a back view thereof. The nearest point of approach of the disks is at the back near the lowest point.

For operating with this machine it is drawn over the soil by means of horses or other traction power in such manner that the disks are situated one on each side of a row of beetroots. By their weight they become embedded in the soil up to the ribbed flanges B, which rest on the surface and cause them to revolve as the vehicle advances. By this means the beet roots are seized between the disks and the wedging effect produced is such that they are withdrawn from the soil without the latter being materially disturbed. The extraction is facilitated by the fact that the band of soil seized between the disks with the beet roots is compressed in passing to that part of the disks where these are nearest together, whereby the small beet roots which are situated at the sides of the large ones are extracted together with these. The operation is also facilitated by the fact that the roots extend from one beet root to the contiguous ones, and consequently the extraction of the one also assists in the extraction of the next following one.

The beet roots, after extraction, are led against the piece E formed of one, two, or three bars connected together at F. In a socket fixed on these bars is secured, by setting screws or other means, the stem of a cutter G with triangular blade, the point of which penetrates into and completely severs the head of the beet root.

In place of a single cutter there may be used two placed side by side, of which the one may be slightly lower than the other, so that in this case the two cutters would operate conjointly in cutting off the head. When the beetroots, in rising, come in contact with the bars E their leaves pass through the space between them, and whatever may be the height to which they project from the soil when in the ground, the heads will always be presented to the cutter or cutters in such manner as to be cut at the same thickness.

The beetroots, with the heads cut off may either be thrown onto the soil behind the machine, or they may be received by an elevator which delivers them into a traveling receptacle behind the machine.

The piece E has at F a stem which can slide vertically in a socket on the framing. The piece E also carries a rod I sliding in a socket of the framing and carrying a helical spring. By this means the piece E presents a certain elastic resistance to the shock of the beetroots which, being planted too high in the soil, are depressed by the piece E to the same level as the beetroots that are planted lower down.

This machine can be employed not only for extracting beetroots but also carrots, chicory roots, potatoes, and other tubers. It is only requisite in these other applications, to proportion the dimensions and the inclination of the disks and their distance apart to suit the roots or tubers to be operated upon. In most such cases the cutter G is not required and the piece E can be readily removed.

When the machine is required to travel without operating, for example on roads, or when turning for passing from one row of beetroots to another, the disks are raised above the soil by any suitable means, such as a hand lever, pivoted to the front part of the framing and connected by a link to the back part which carries the disks and is pivoted to the front part as shown; or it might be effected by a screw spindle carried by the front part of the framing and rotated by a hand wheel.

Having thus described the nature of my said invention and the best means I know of carrying the same into practical effect, I claim—

1. A machine for extracting beet roots and other roots or tubers consisting of a vehicle having two revolving flanged disks A mounted on an axis so to be inclined to each other, both in the horizontal and the vertical direction, their nearest point of approach being situated at the back and near the lowest point, the flange adapted to rest on the ground, while the outer edges of the disks enter the ground to seize the roots between them and with the wedging action as the disks rotate to raise the beets out of the soil, substantially as described.

2. A machine for extracting beet-roots and other roots or tubers consisting of a vehicle having two revolving flanged disks A mounted on an axis so as to be inclined to each other in the horizontal and the vertical direction, their nearest point of approach being situated at the back and near the lowest point to seize the roots between them, with the wedging action as the disks rotate, and cutting devices between the disks for removing the heads of the beet-roots, substantially as described.

In testimony whereof I have signed my name to this specification in the presence of two subscribing witnesses.

LOUIS FRENNET WAUTHIER.

Witnesses:
  GUST TIERNEY,
  GREGORY PHELAN.